United States Patent [19]
Kitamura et al.

[11] Patent Number: 5,297,245
[45] Date of Patent: Mar. 22, 1994

[54] DATA INPUT SYSTEM WITH AUTOMATIC DUPLICATION OF REPETITIVE DATA TO A DATABASE

[75] Inventors: Kozo Kitamura; Junji Tanaka; Masaaki Kurata; Kiyoshi Kakuda, all of Nara; Kenji Hirano, Osaka; Hirofumi Yanaru, Nara, all of Japan

[73] Assignee: Sharp Kabushiki Kaisha, Osaka, Japan

[21] Appl. No.: 860,298

[22] Filed: Mar. 27, 1992

Related U.S. Application Data

[63] Continuation of Ser. No. 361,909, May 17, 1989, abandoned.

[30] Foreign Application Priority Data

May 17, 1988 [JP] Japan .................... 63-119957

[51] Int. Cl.⁵ ................ G06F 3/00; G06F 15/403
[52] U.S. Cl. ...................... 395/149; 395/144; 395/600; 364/419.19; 364/DIG. 2; 364/943; 364/943.43; 364/948.2; 364/939; 364/939.7
[58] Field of Search ............ 395/144, 145, 146, 149, 395/600, 250; 364/419

[56] References Cited

U.S. PATENT DOCUMENTS

| | | | |
|---|---|---|---|
| 3,235,848 | 2/1966 | King et al. | 395/146 |
| 4,212,077 | 7/1980 | Vittorelli | 364/900 |
| 4,247,906 | 1/1981 | Corwin et al. | 395/146 |
| 4,330,845 | 5/1982 | Damerau | 364/900 |
| 4,408,302 | 10/1983 | Fessel et al. | 364/900 |
| 4,553,860 | 11/1985 | Imaizumi et al. | 364/900 |
| 4,736,308 | 4/1988 | Heckel | 395/144 |
| 4,918,648 | 4/1990 | Taguchi et al. | 364/900 |
| 4,972,349 | 11/1990 | Kleinberger | 395/144 |
| 5,067,070 | 11/1991 | Miyao et al. | 395/146 |

OTHER PUBLICATIONS

Anderson et al., "PC-DOS, Tips & Traps," 1986 by McGraw-Hill, Inc., pp. 156–157.

Primary Examiner—Paul V. Kulik
Attorney, Agent, or Firm—Morrison & Foerster

[57] ABSTRACT

A data input system useful in a data base such as an address data management system. This data input system can reduce the number of key operation and the possibility of erroneously inputting data. This system comprises: a display for displaying input data; a first memory for storing data displayed on the display, a second memory for temporarily storing the displayed data; and a control unit for displaying the data stored in the second memory.

10 Claims, 10 Drawing Sheets

| NAME | COMPANY | SECTION | POST | TEL |
|---|---|---|---|---|
| AMPERE, ROBERT | SHARP CORP. | ELEC. DEPT. | MANAGER | 06-123-1121 |
| ARCHIMEDES, MARK | SHARP CORP. | PHY. DEPT. | MANAGER | 06-123-1121 |
| ARISTOTLE, PAUL | SHARP CORP. | PHY. DEPT. | MANAGER | 06-123-1456 |
| AVOGADRO, STEVEN | SHARP CORP. | CHEM. DEPT. | MANAGER | 06-123-1112 |

▶ A B C D E............Z

< ADDRESS > FOR OTHER ITEMS, HIT DETAIL

1988・1・6・9:10

| F1 | F2 | F3 | F4 | F5 | F6 | F7 | F8 | F9 | | |
|---|---|---|---|---|---|---|---|---|---|---|
| REG | DETAIL | RETRIEVE | PRINT | CORRECT | INPUT | COPY | | FORWARD | BACKWARD | ERASE |

| NAME | |
|---|---|
| AMPERE, ROBERT | |
| ARCHIMEDES, MARK | |
| ARISTOTLE, PAUL | |
| AVOGADRO, STEVEN | |

▲ A B C D E ............ Z

| NAME | [ AMPERE, ROBERT ] |
|---|---|
| COMPANY | [ SHARP CORP. ] |
| SECTION | [ ELEC. DEPT. ] |
| POST | [ MANAGER ] |
| TEL | [ 06-123-1121 ] |
| FAX | [ 06-123-1111 ] |
| ZIP CODE | [ 141- ] |
| ADDRESS | [ 22-22, NAGAIKE-CHO, ABENO-KU, OSAKA 545 JAPAN ] |
| CLASS | [ ELEC. ] |
| REMARKS | [ ADVANCED IN HIGH TECHNOLOGY ] |

1988 · 1 · 6 · 9:10

< DETAIL >

| F1 | F2 | F3 | F4 | F5 | F6 | F7 | F8 | F9 | |
|---|---|---|---|---|---|---|---|---|---|
| | | | | | END | | | DITTO | NEXT |

DATA INPUT SYSTEM WITH AUTOMATIC DUPLICATION OF REPETITIVE DATA TO A DATABASE

This application is a continuation of U.S. application Ser. No. 361,909, filed May 17, 1989 now abondoned.

BACKGROUND OF THE INVENTION

1. Field of the Invention

This invention relates to a data input system, and more particularly to a data input system which is useful in a data management system such as an address data management system.

2. Description of the Prior Art

A data management system such as an address data management system has been widely employed. In an address data management system for a business purpose, for example, data on each person contain many items such as his or her name, name of company, section, post, address of the company, telephone number, etc. Hereinafter, such a set of data on one person is referred as "a personal data set". A personal data set is usually input by using a display means such as a CRT on which a format containing blank columns is displayed. These blank columns correspond respectively to each of the items in the personal data set and are arranged in a predetermined layout pattern. The contents of each item of the data set are written in a column corresponding to the item, by operating a keyboard. When all items of the personal data set have been input, a quit command is input to cease the data input operation, thereby the input data are stored in predetermined locations of a memory and the display is cleared.

In such an address data management system, it is often that a plurality of personal data sets contain the same data. For example, when inputting data on persons who work in the same company, the name and address of the company must be input for each person. In other words, the same contents must be repeatedly input for each personal data set. Hence, a prior art data input system often requires cumbersome repeated key operations, causing the possibility of erroneously inputting data to increase.

Telefacsimile (telefax) apparatus (telecopiers) are widely used today. In most address data management systems, therefore, a telefax number is also input in addition to a telephone number. Usually, the out-of-town exchange number of a telefax number is same as that of the telephone. In such an address data management system, however, the out-of-town exchange number of a telefax number must be input even when the same number has been input as a part of the telephone number. In this way, a conventional data input system has a drawback in that the same data must be input many times.

SUMMARY OF THE INVENTION

The data input system of this invention, which overcomes the above-discussed and numerous other disadvantages and deficiencies of the prior art, comprises a display means for displaying input data; a first memory means for storing data displayed on said display means; a second memory means for temporarily storing said displayed data; and a control means for displaying said data stored in said second memory means.

The data input system comprises a display means for displaying input data; a judging means for judging whether a predetermined item in the data displayed on said display means contains a data train of a predetermined type or not; and a control means for displaying said data train in another item in said data, when said predetermined item in said predetermined item contains said data train.

The data input system comprises a display means for displaying input data; a first memory means for storing data displayed on said display means; a second memory means for temporarily storing said displayed data; a first control means for displaying said data stored in said second memory means; a judging means for judging whether a predetermined item in the data displayed on said display means contains a data train of a predetermined type or not; and a second control means for displaying said data train in another item in said data, when said predetermined item in said predetermined item contains said data train.

In a preferred embodiment, the system further comprises a retrieval means, said retrieval means comprising a selection means which selects either of all of data and data which have been obtained as a result of the preceding retrieval operation, as a data group which is to be subjected to a retrieval operation.

Thus, the invention described herein makes possible the objectives of:

(1) to provide a data input system which can reduce the necessity of inputting repeatedly the same data;
(2) to provide a data input system which can decrease the burden of an operator;
(3) to provide a data input system which is easy to operate;
(4) to provide a data input system which can decrease the number of key operations;
(5) to provide a data input system which can eliminate the possibility of erroneously inputting data; and
(6) to provide a data management system which can easily retrieve desired data.

BRIEF DESCRIPTION OF THE DRAWINGS

This invention may be better understood and its numerous objects and advantages will become apparent to those skilled in the art by reference to the accompanying drawings as follows:

FIGS. 3A to 3C show the format for inputting data in the system of FIG. 1.

FIGS. 6A to 6C show the format for inputting data in the system of FIG. 5.

DESCRIPTION OF THE PREFERRED EMBODIMENTS

Figure 1:
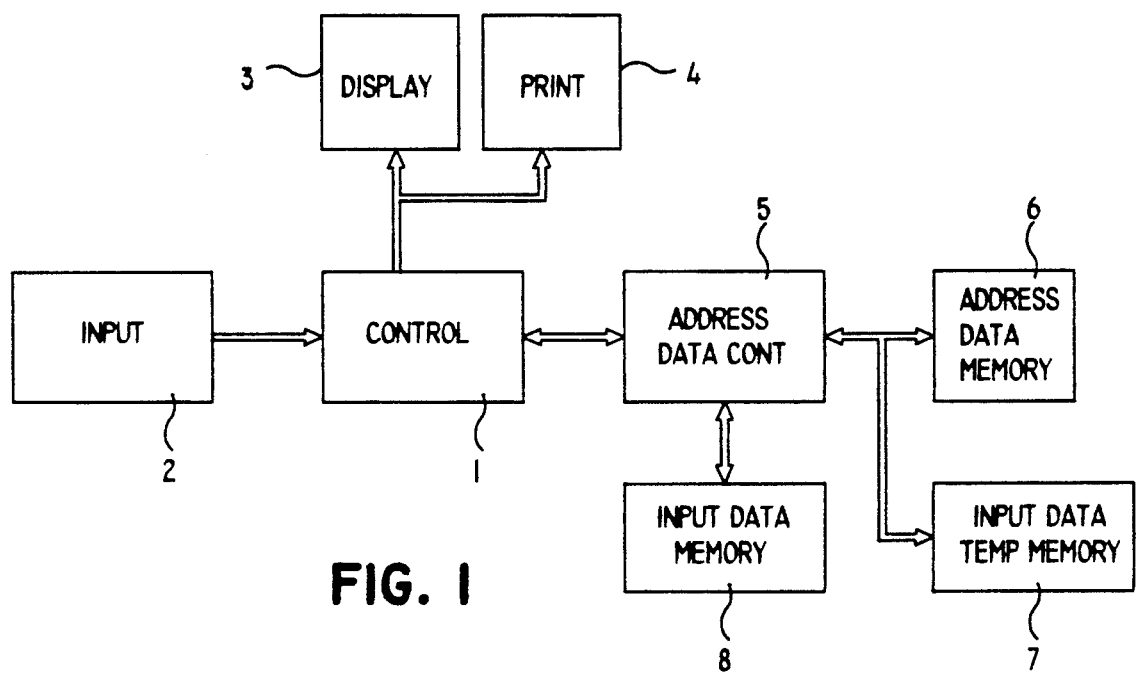
FIG. 1 is a block diagram of a data input system according to the invention.

A data input system according to the invention is diagrammatically shown in FIG. 1. The system of FIG. 1 is a data input system for an address data management system, and comprises: a main control unit 1 for controlling the system as a whole; an input unit 2 such as a keyboard for inputting data; a display unit 3 such as a CRT or LCD for displaying data; and a print unit 4 which produces a hard copy of data. The input unit 2, display unit 3 and print unit 4 are connected to the main control unit 1. To the main control unit 1, also connected is an address data control unit 5 which controls, under the control of the main control unit 1, the processes (display, print, input, etc.) for address data. Three memory devices, an address data memory 6, an input data temporary memory 7 and an input data memory 8 are connected to the address data control unit 5.

Figure 3B:
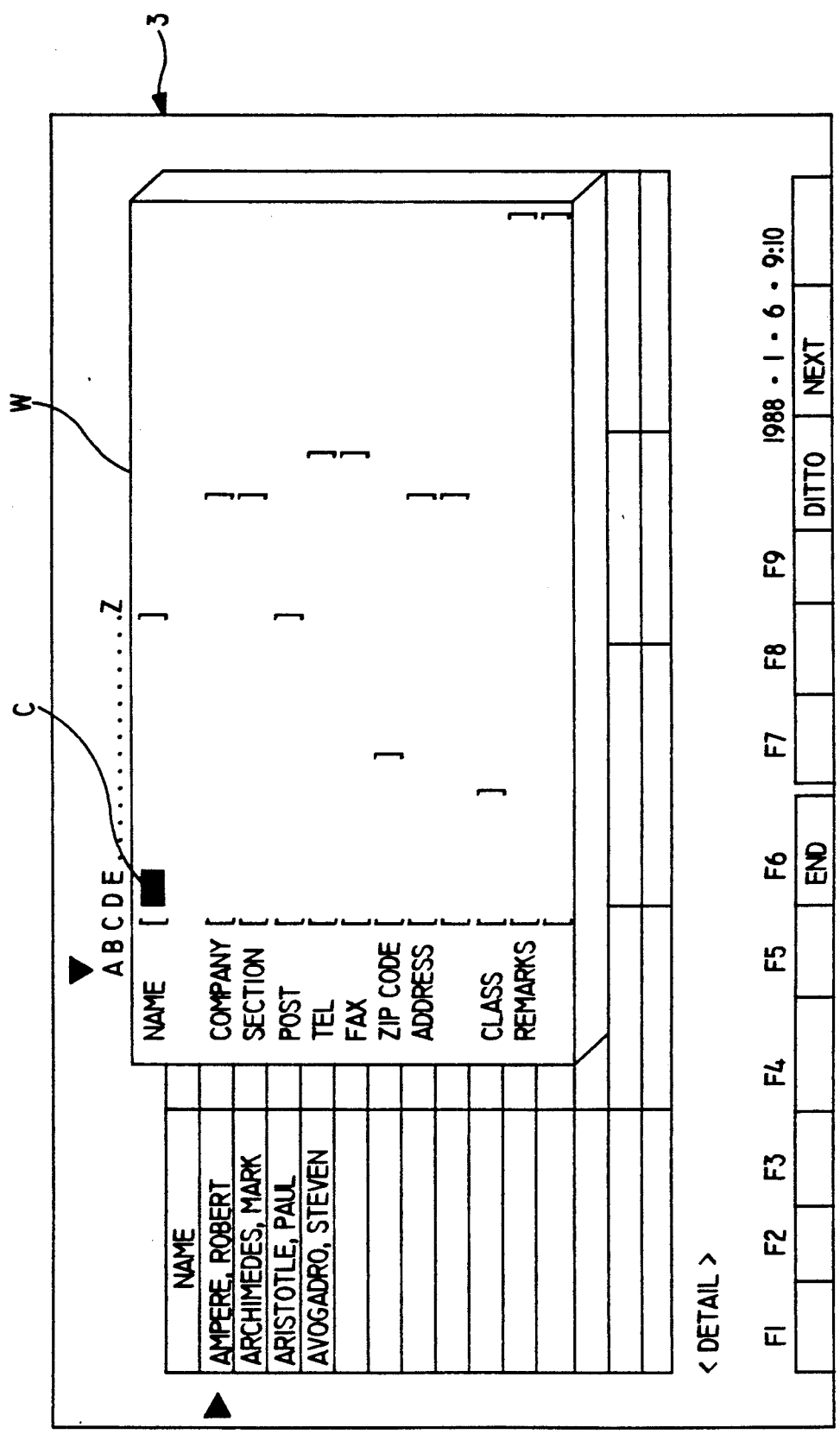

Upon starting this system, the address control unit 5 fetches a part of address data stored in the address data memory 6, to display them in a list format as shown in FIG. 3A. When a function key F7 (INPUT) is pressed, the operation enters into the input mode. In the input mode, as shown in FIG. 3B, a window W is opened on the display 3 to display items of data and blank columns which are to be filled, and the functions of the function keys on the keyboard 2 are changed as indicated in the lower portion of the display 3. The contents of each items are entered through the keyboard 2 into the blank columns. The reference C designates a cursor.

Figure 2:
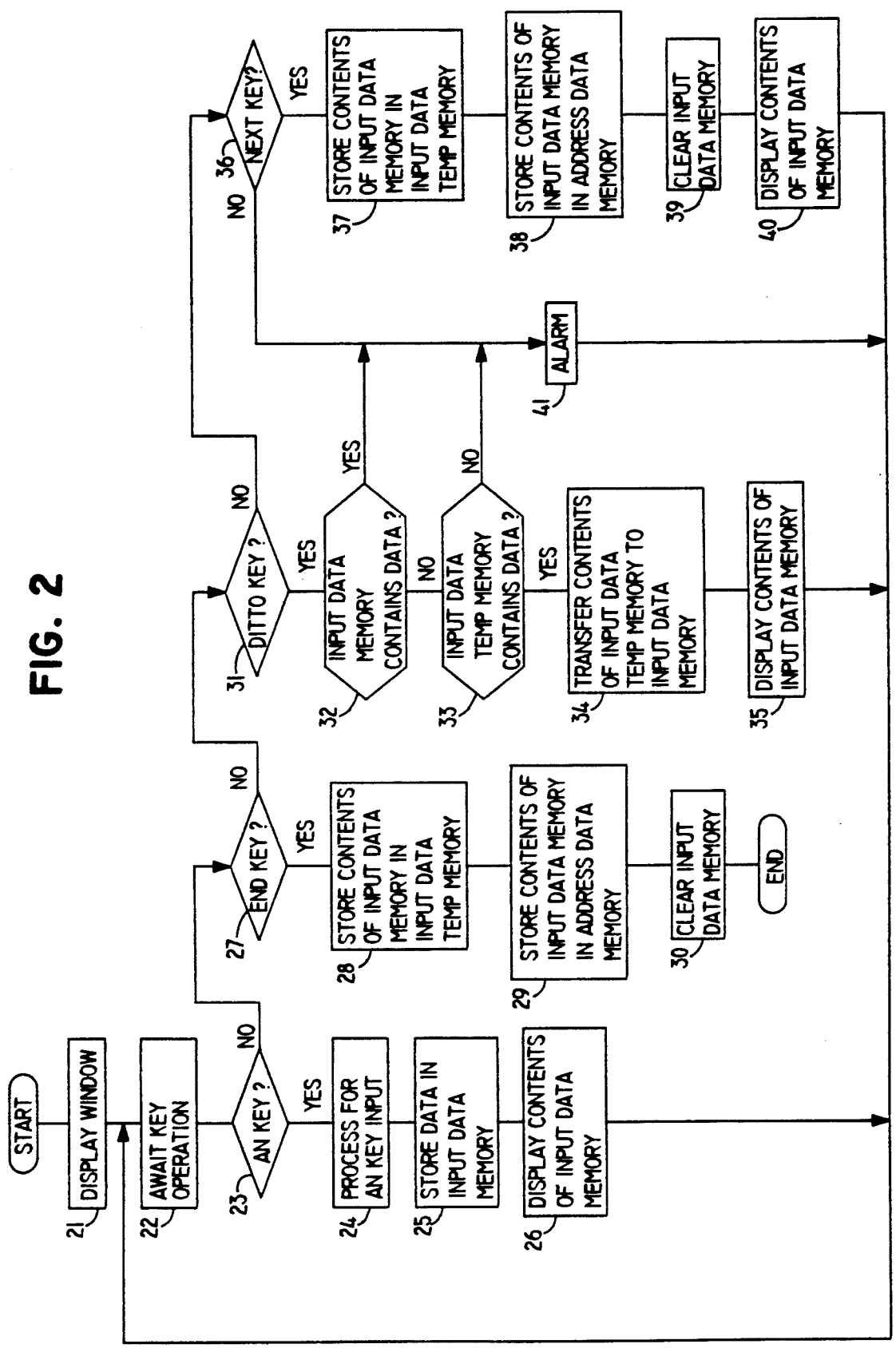
FIG. 2 is a flow chart of the system of FIG. 1.

The flow of the data input mode in this system will be described with reference to FIG. 2. As mentioned above, the window W is opened (step 21), then the system awaits a key operation (step 22). Depending upon the kind of a key operated, the following processes are conducted.

(a) When an alphanumeric key is pressed:

Conventional processes are performed to process character signals from the keyboard 2 (step 24) so that input data are stored in the input data memory 8 (step 25). The contents of the input data memory 8 are displayed (step 26), and then the operation returns to step 22.

(b) When a function key F6 (END) is pressed:

The contents of the input data memory 8 are stored in the input data temporary memory 7 and address data memory 6 (steps 28 and 29). The input data memory 8 is cleared (step 30) to cease the data input mode.

(c) When a function key F11 (NEXT) is pressed:

The contents of the input data memory 8 are stored in the input data temporary memory 7 and address data memory 6 (steps 37 and 38). The input data memory 8 is cleared, and the contents of the memory 8 are displayed (steps 39 and 40). Namely, the state of the display 3 becomes as shown in FIG. 3B to display no data. Thereafter, the operation returns to step 22.

(d) When a function key F10 (DITTO) is pressed:

The main control unit 1 judges whether the input data memory 8 contains input data or not (step 32). When input data are stored in the input data memory 8, an alarm is sounded (step 41) to prevent the input data from being erroneously erased, and then the operation returns to step 22. When the input data memory 8 contains no input data, a further judgment whether the input data temporary memory 7 contains data or not is conducted (step 33). When no data are stored in the input data temporary memory 7, an alarm is sounded (step 41), and then the operation returns to step 22. When the input data temporary memory 7 contains data, the data are transferred to the input data memory 8 (step 34). The contents of the input data memory 8 are displayed (step 35), and the operation returns to step 22. FIG. 3C illustrates the display 3 in the case that the data for Mr. Ampere have been input just before. In order to complete another personal data set, therefore, it is sufficient for the operator to input only the data contents which are different from those displayed at present on the display 3.

The operation in the data input mode is conducted as follows: The data on a person are entered. When data on only one person are to be entered, the END key F6 is pressed to cease the data input mode. When data on two or more persons are to be entered, the NEXT key F11 is pressed so that the display 3 becomes as shown in FIG. 3B. The data on the second person can be input through the keyboard 2. In the case where the data on the first person and those on the second person have common data, the display 3 is changed, by pressing the DITTO key F10, as shown in FIG. 3C to show the personal data set of the preceding person (i.e., the first person). Among the data displayed in the window W, only those items which are not common to both the first and second persons are changed to complete the personal data set for the second person. Then, the END key F6 is pressed.

As described above, the data which are transferred from the input data temporary memory 7 to the input data memory 8 by the operation of the DITTO key F10 are those which have been transferred from the input data memory 8 by the operation of the END key F6 or NEXT key F11 (namely, a personal data set which have been input and stored in the address data memory 6 immediately before). When personal data sets on two or more persons who work in the same company are to be entered sequentially, the input operation of data for some items such as the name, address and telephone number of the company can be eliminated in the data input for the second or later person, thereby increasing the efficiency of the data input.

The system of FIG. 1 has a data retrieving function by which one or more personal data sets satisfying given retrieval condition can be searched from stored personal data sets. The operation of the data retrieval will be described with reference to FIGS. 4A and 4B. Hereinafter, a data group which is to be subjected to the retrieval is referred as "data group A". In the first stage, all the data stored in the address data memory 6 belong to the data group A. A conditional expression for retrieval is entered (step 42) to start a retrieval routine (step 43).

Figure 4B:
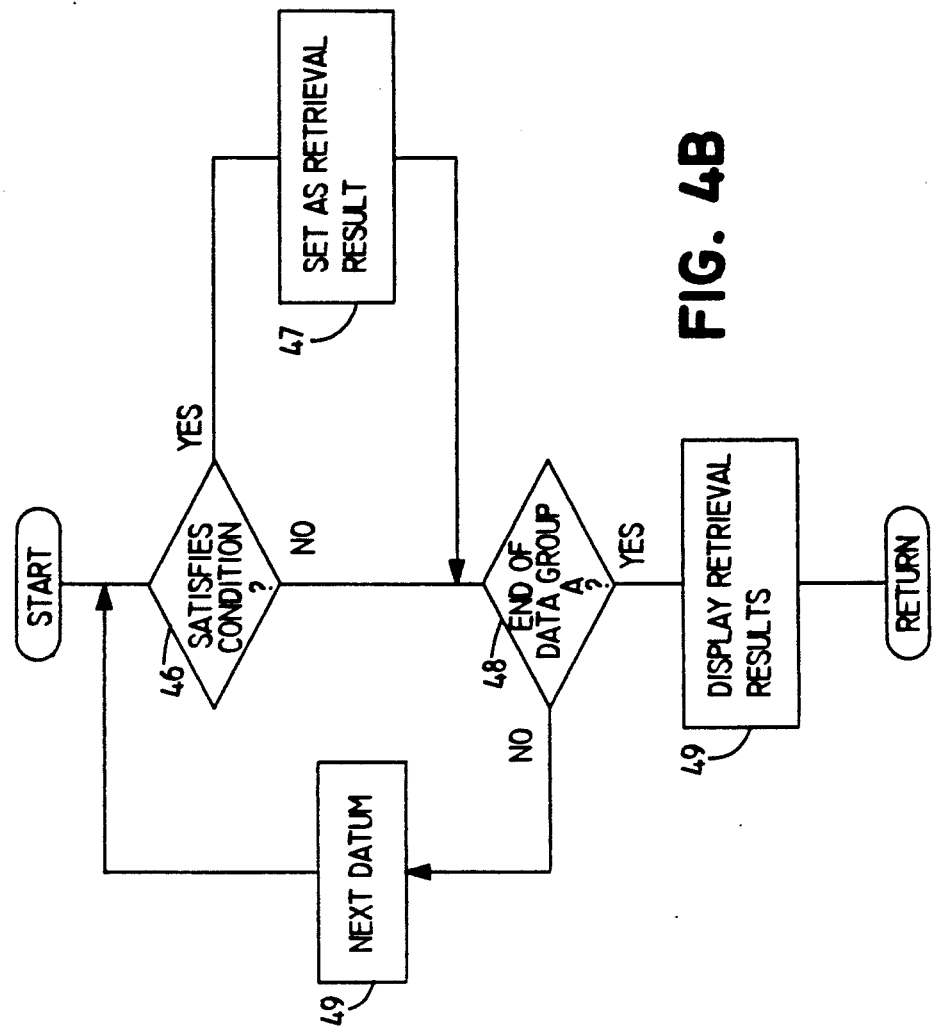
FIGS. 4A and 4B show the flow of retrieving data in the system of FIG. 1.
Figure 4A:
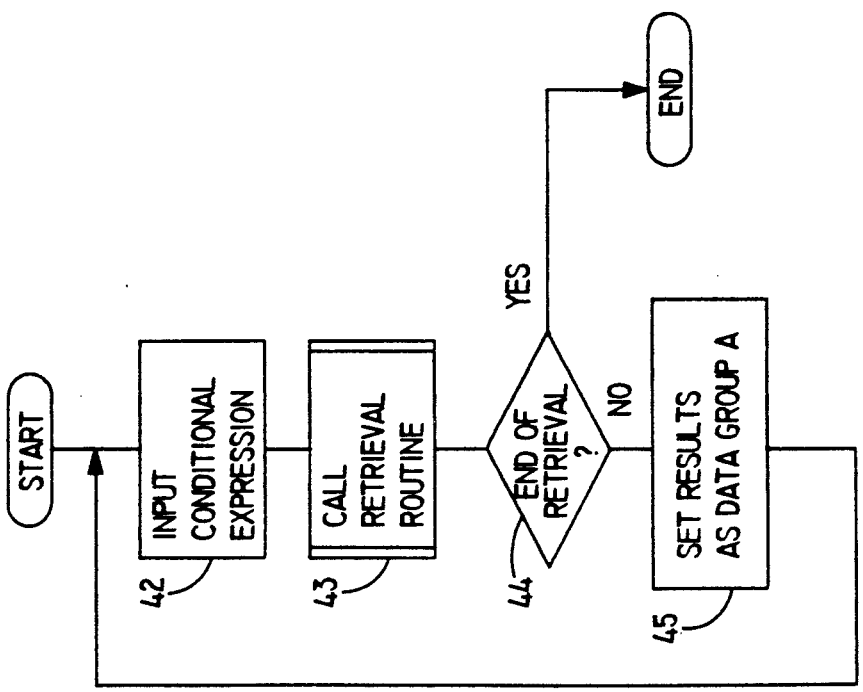

FIG. 4B illustrates the flow in the retrieval routine. A datum in the data group A is judged whether it satisfies the condition or not (step 46). If the datum satisfies the condition, it is set as a retrieval result (step 47). These processes are repeated until all data in group A are treated. Then, the obtained retrieval results are displayed (step 49). When the retrieval routine is finished, the operator is requested to decide whether the retrieval is to be continued or not (step 44). When the obtained retrieval results are not sufficiently narrowed, an instruction for conducting a new retrieval process with data group A based on the obtained retrieval results may be input through the keyboard 2 so that the operation returns to step 42 (steps 44 and 45). In step 42, an additional retrieval condition is entered to make the range of the retrieved data sufficiently narrow.

As seen from the above, this system can easily retrieve data step by step using a complicated condition such as "P and Q and R". In the prior art, since a retrieval operation is conducted against data group A which is the same as that used in the preceding retrieval operation, it is impossible to retrieve data step by step.

Figure 5:
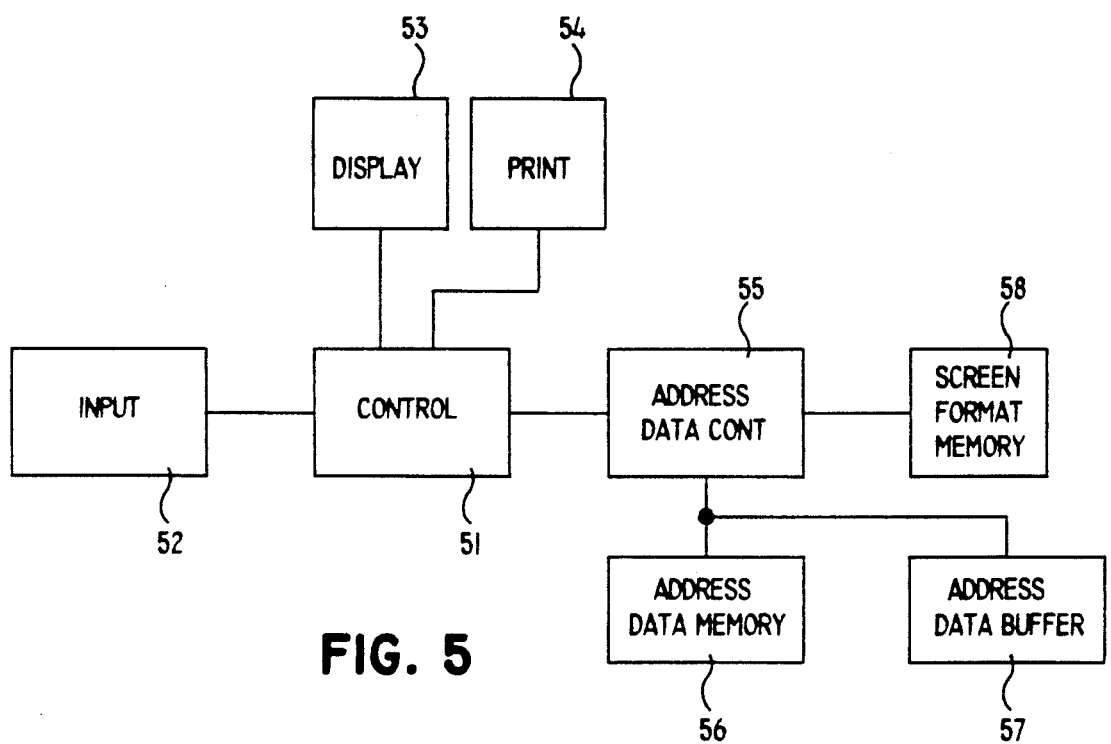
FIG. 5 is a block diagram of another data input system according to the invention.

FIG. 5 illustrates another data input system according to the invention. The system of FIG. 5 also is the one for an address data management system. In the same way as the system of FIG. 1, the system of FIG. 5 comprises a main control unit 51 to which an input unit 52, a display unit 53, a print unit 54, and an address data control unit 55 are connected. To the address data control unit 55, connected are an address data memory 56 storing all address data, an address data buffer 57, and a screen format memory 58 storing formats for screen display.

Figures 6A, 6B, 6C:
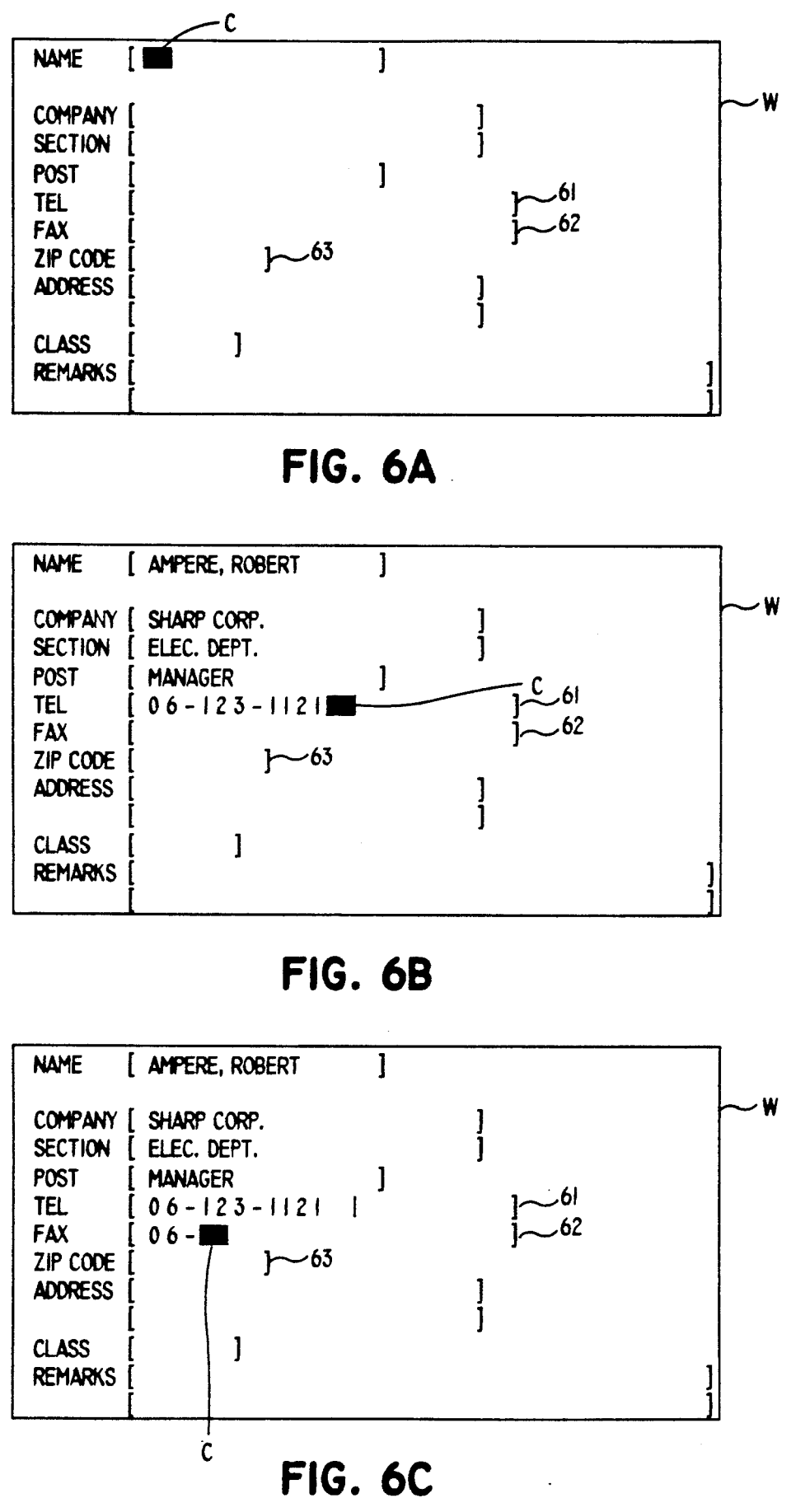

When address data are input using this system, the display unit 53 displays an input format in the window W as shown in FIG. 6A. The items of a personal data set include a telephone number (column 61) and a telefax number (column 62). FIG. 6B shows the input format in the state wherein a telephone number has been input in the column 61. The cursor C is displayed immediately after the telephone number. In the telephone number, the out-of-town exchange number "06" and the in-town exchange number "123" are separated from each other by a hyphen.

Figure 7:
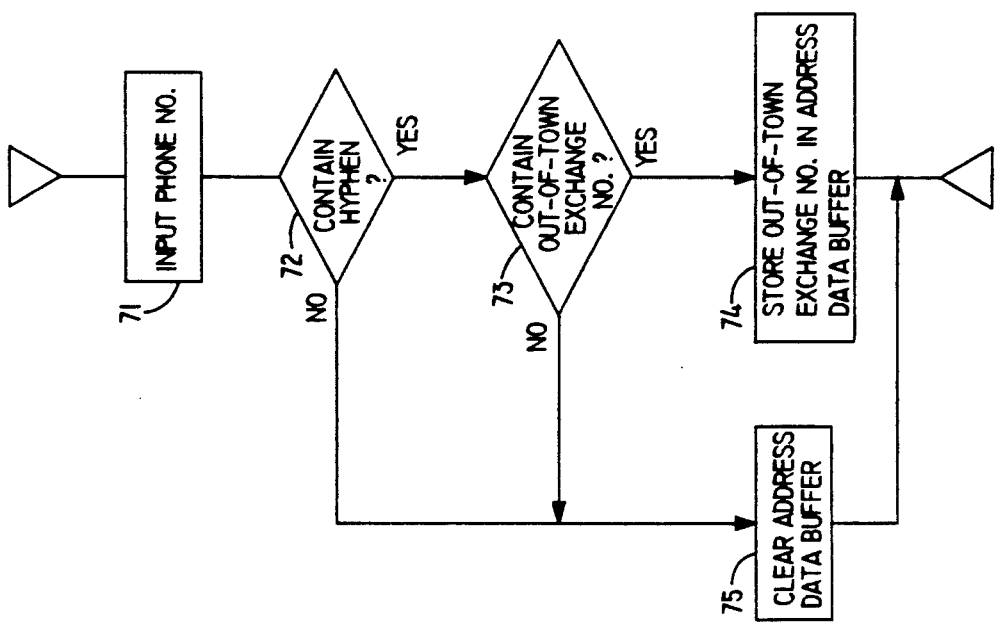

FIG. 7 shows the flow of inputting a telephone number and a telefax number. The telephone number is input (step 71), and then checked to see whether a hyphen is contained in the input telephone number (step 72). When at least one hyphen is contained, the telephone number is checked further to see whether it includes an out-of-town exchange number or not (step 73). This check may be done by searching a sequence of numerals which exists before the first hyphen in the questioned telephone number and begins with zero. When the input telephone number contains an out-of-town exchange number, the out-of-town exchange number "06" is stored in the address data buffer 57 (step 74). When the input telephone number does not contain a hyphen or an out-of-town exchange number, the address data buffer is cleared (step 75).

Figure 8:
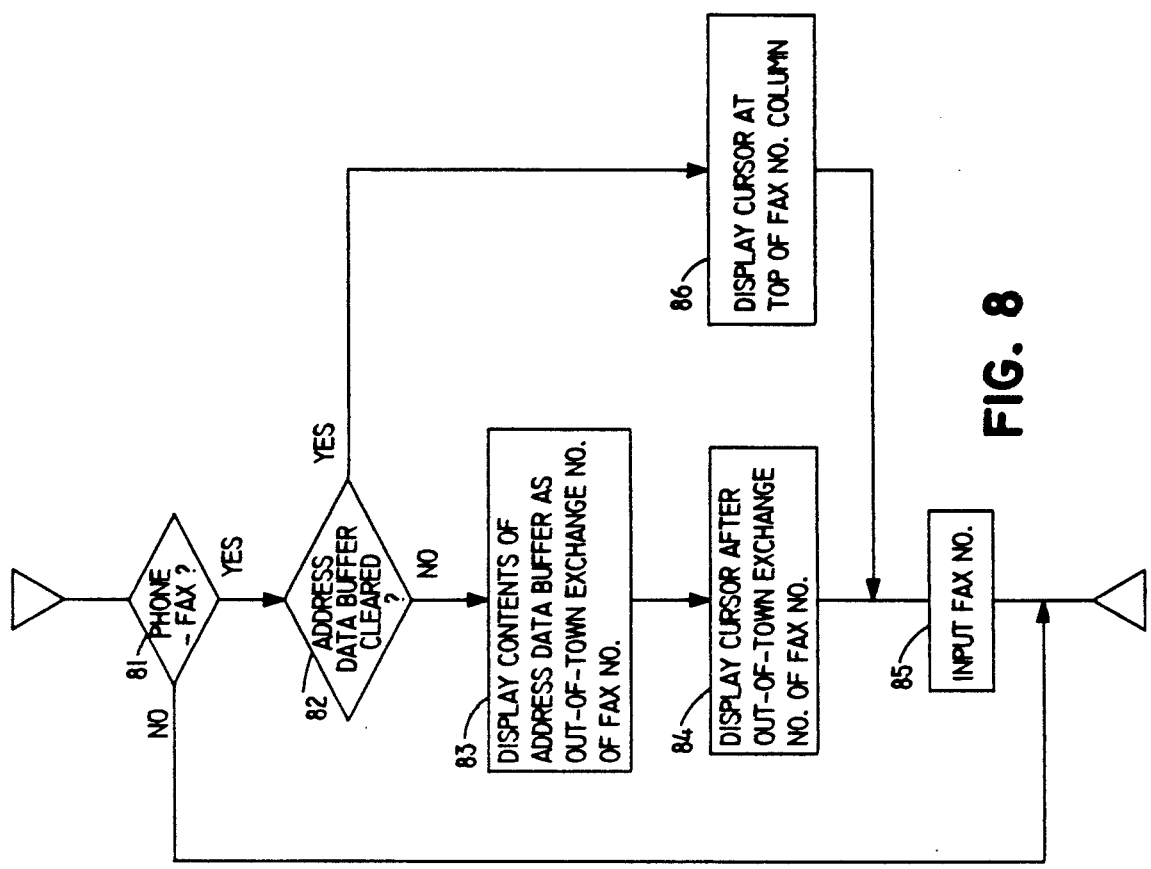
FIGS. 7 to 9 show the flow charts of inputting data in the system of FIG. 5.

When the cursor C is moved from the column 61 (telephone number) to the column 62 (telefax number), the processes shown in FIG. 8 are conducted. The system detects in step 81 that the cursor C has moved to the column 62, and checks in step 82 to see whether the address data buffer 57 is in the cleared state or not. When the address data buffer 57 is in the cleared state, the cursor C is moved to the top position in the column 62 to prompt the input of all the numerals of the telefax number (step 86). When the address data buffer 57 is not in the cleared state, the contents "06" of the address data buffer 57 are displayed at the top portion of the column 62, as the out-of-town exchange number of the telefax number, and the cursor C is moved behind the out-of-town exchange number "06" in the column 62 (steps 83 and 84) so that the operator can input the remaining numerals of the telefax number through the input unit 52 (FIG. 6C). If the telefax number and the telephone number have a common out-of-town exchange number, therefore, it is unnecessary to input twice the common out-of-town exchange number, resulting in reducing the number of input operations.

Figure 9:
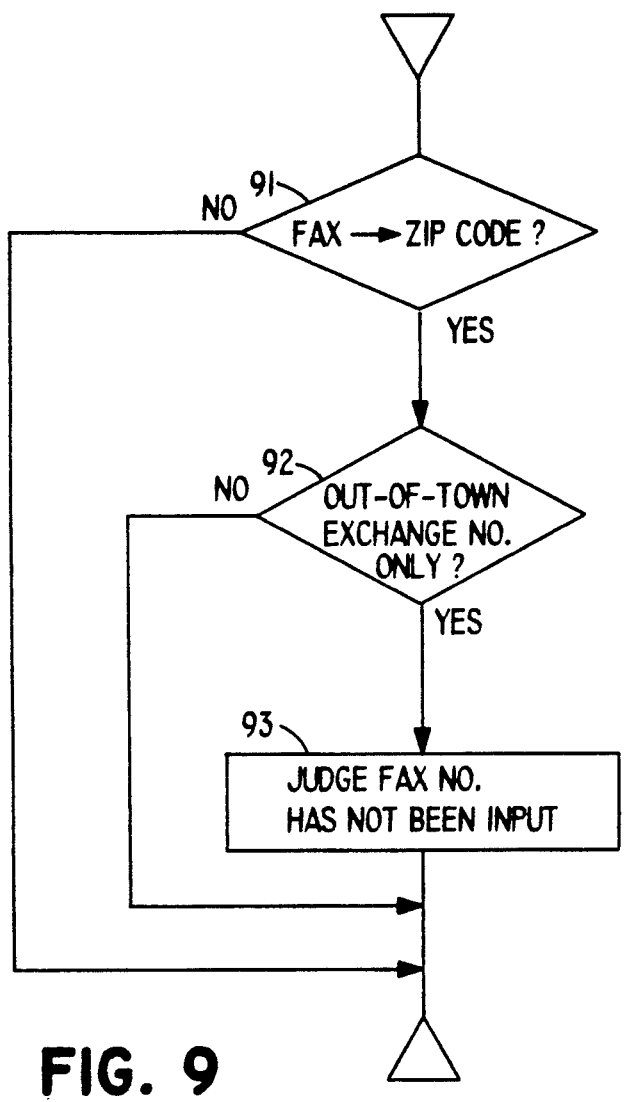

When the cursor C has moved to a column 63 (zip code) which is positioned after the column 62 (telefax number), the processes shown in FIG. 9 are conducted. The system checks whether the column 62 contains only the out-of-town exchange number or not (step 92). If the column 62 contains only the out-of-town exchange number, the system judges that a telefax number has not been input, and clears the contents of the column 62 from the display 53 (step 93). When it is not required to input a telefax, hence, the system can proceed to the step of inputting a zip code into the column 63, only by moving the cursor C from the column 62 to the column 63.

The present invention has been described as related to the systems for an address data management system, it is believed obvious that the invention is applicable to data management systems of other kinds. Moreover, it will be easily understood to a person skilled in the art that the above-described two systems can be combined.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a data management system comprising a data input means, said data management system further comprises:
   a display means for displaying a data set including data items, said data set being input through said data input means by an operator, and for displaying sequentially a plurality of images for inputting data, the plurality of images for inputting data including a plurality of areas for displaying data sets, the display means displaying inputted data in the plurality of areas corresponding to the inputted data;
   a determination means for determining whether a data item among said data set displayed on the areas for displaying data sets on said display means contains a data string of predetermined type or not; and
   a control means for displaying said data string on one of the areas on the selected areas of said display means as at least a part of the contents of a data item in said data set other than said predetermined item other than said predetermined data item, when said determination means determines that said predetermined data item contains said data spring of said predetermined type, and when other areas are selected on which the inputted data sets are displayed.

2. A system according to claim 1, wherein said system further comprises a retrieval means for retrieving one or more data sets selected from a plurality of data sets stored in a first memory means according to a predetermined criteria thereby forming a first group of data sets, and for retrieving one or more data sets selected from said first group according to another predetermined criteria to form a second group of data sets.

3. In a data management system comprising a first memory means for storing data including a plurality of data sets, and a data input means, said data management system further comprises:
   a second memory means for storing a data set input through said input means by an operator;
   a display means for displaying the contents of said second memory means, and for displaying sequentially a plurality of images for inputting data, the plurality of images for inputting data including a plurality of areas for displaying data sets, the display means displaying inputted data sets in the plurality of areas corresponding to the inputted data;

a third memory means;

a first processing means for storing the contents of said second memory means into said first memory means as a first data set and into said third memory means in response to a first operation of said data input means, said first processing means operatively connected to said first to third memory means;

a second processing means for transferring the contents of said third memory means to said second memory means in response to a second operation of said data input means, said second processing means operatively connected to said second and third memory means;

means for editing and storing the contents of said second memory means after said second operation to form a second data set which is stored in said first memory means without affecting the contents of said first data set; and means for erasing an image of inputted data sets on the plurality of areas of the display means, and displaying transferred data into the second memory means on the plurality of areas corresponding to the transferred data in a case that inputted data in the third memory means are transferred into the second memory means.

4. A system according to claim 3, wherein said system further comprises a retrieval means for retrieving one or more data sets selected from said plurality of data sets stored in said first memory means according to a predetermined criteria thereby forming a first group of data sets, and for retrieving one or more data sets selected from said first group according to another predetermined criteria to form a second group of data sets.

5. In a data management system comprising a first memory means for storing data including a plurality of data sets, and a data input means, said data management system further comprises:

a second memory means for storing a data set input through said data input means by an operator;

a display means for displaying the contents of said second memory means including said data set stored therein, and for displaying sequentially a plurality of images for inputting data, the plurality of images for inputting data including a plurality of areas for displaying data sets, the display means displaying inputted data sets in the plurality of areas corresponding to the inputted data;

a third memory means;

a first processing means for storing the contents of said second memory means into said first memory means and said third memory means in response to an operation of said data input means, said first processing means operatively connected to said first to third memory means;

a second processing means for transferring the contents of said third memory means to said second memory means in response to an operation of said data input means, said second proceeding means operatively connected to said second and third memory means;

a determination means for determining whether a data item among said data set displayed on the areas for displaying data sets on said display means contains a data string of a predetermined type or not; and a control means for displaying said data string on one of the areas of the selected areas of said display means as at least a part of the contents of a data item other than said predetermined data item, when said determination means determines that said predetermined data item contains said data string of said predetermined type, and when other areas are selected on which the inputted data sets are displayed.

6. A system according to claim 5, wherein said system further comprises a retrieval means for retrieving one or more data sets selected from said plurality of data sets stored in said first memory means according to a predetermined criteria thereby forming a first group of data sets, and for retrieving one or more data sets selected from said first group according to another predetermined criteria to form a second group of data sets.

7. In a data management system including data input means for entering data sets including data items and a first memory for storing said data sets, the data management system further comprising:

a second memory connected to said data input means for receiving and storing entered data items of said data sets entered at said data input means;

a third memory for temporarily storing said entered data items;

control input means for entering control information including at least a repeat control signal and an enter control signal for controlling data transfers to said first, second and third memories;

first processing means interconnecting said second memory with said first and said third memory for transferring data items stored in said second memory to said first memory to store as a first data set and to said third memory, in response to receiving said enter control signal from said control input means;

second processing means interconnecting said third memory with said second memory for transferring data items stored in said third memory to said second memory in response to receiving said repeat control signal from said control input means;

means for editing and storing the contents of said second memory after said response to said repeat control signal to form a second data set which is stored in said first memory without affecting the contents of said first data set; and display means for displaying data information stored in said second memory, and for displaying sequentially a plurality of images for inputting data, the plurality of images for inputting data including a plurality of areas for displaying data sets, the display means displaying inputted data sets in the plurality of areas corresponding to the inputted data, and means for erasing the image of inputted data sets on the plurality of areas of the display means, and displaying transferred data into the second memory means on the plurality of areas corresponding to the transferred data in a case that inputted data in the third memory means are transferred into the second memory means.

8. An address data management system for selectively displaying address data information, including:

a first memory for storing data information including a plurality of data sets, each of said data sets comprising corresponding personal data items including a personal name, address and telephone information, and data input means for allowing a user to enter a selection criteria based on said data sets for determining which of said data sets stored in said first memory are to be selected for display, said data input means further comprises means for allowing said user to enter another selection criteria and said selecting means further comprises means for selecting data sets which meet said another criteria from said data sets which meet said criteria, the data management system further comprising display means for displaying data sets to be displayed;

selecting means connected to said first memory for selecting said data sets which meet said selection criteria and for providing said so selected data sets to said display means, data setting means for setting the selected data sets according to the selection criteria as data sets to be selected by the selecting means according to the another selection criteria.

9. In a data management system including a first memory for storing a plurality of data sets each including data items, and data input means for entering said data sets including said data items, at least some of said data items comprising data elements including selected data elements, the data management system further comprising:

a second memory for storing input data forming all or part of an input data set;

a third memory for temporarily storing said input data;

control input means for entering control information including at least a control signal for controlling data transfers to said first, second and third memories;

first processing means for transferring said input data stored in said second memory to said first memory in response to receiving said control signal from said control input means;

second processing means including means for detecting the presence of selected data elements stored in said second memory prior to said first processing means effecting said transfer, and for copying or more of said data items from said second memory to said third memory if said selected data elements have been detected in said second memory, and for clearing said third memory if said selected data elements have not been detected in said second memory;

third processing means for scanning said data items copies to said third memory by said second processing means, and for transferring said data item or items from said third memory to said second memory prior to said first processing means effecting said transfer; and display means for displaying said input data stored in said second memory, said input data including said selected data elements transferred from said third memory, and for displaying sequentially a plurality of images for inputting data, the plurality of images for inputting data including a plurality of areas for displaying data sets, the display means displaying inputted data sets in the plurality of areas corresponding to the inputted data.

10. A data management system as claimed in claim 9, wherein said third processing means transfer said data items from said third memory to a location in said second memory corresponding to a different data item.

* * * * *

UNITED STATES PATENT AND TRADEMARK OFFICE
CERTIFICATE OF CORRECTION

PATENT NO. : 5,297,245
DATED : March 22, 1994
INVENTOR(S) : Kozo Kitamura et al.

It is certified that error appears in the above-indentified patent and that said Letters Patent is hereby corrected as shown below:

Drawings:
In Figure 8, referenced item 81 currently reads

"PHONE
— FAX ?", the text should read

--PHONE
—> FAX ?--

Signed and Sealed this

Twenty-eighth Day of June, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,297,245
DATED : March 22, 1994
INVENTOR(S) : Kozo Kitamura, et al It is certified that error appears in the above-indentified patent and that said Letters Patent is hereby corrected as shown below:

In column 6, lines 42/43: immediately prior to "other than said predetermined data item" please delete "other than said predetermined item";

column 6, line 45: "spring" should read --string--;

column 7, line 61: "proceeding" should read --processing--.

Signed and Sealed this

Sixth Day of December, 1994

Attest:

BRUCE LEHMAN

Attesting Officer   Commissioner of Patents and Trademarks